(12) United States Patent
Backhaus et al.

(10) Patent No.: US 12,299,519 B2
(45) Date of Patent: *May 13, 2025

(54) MONITORING OF PRODUCTS

(71) Applicant: BAYER AKTIENGESELLSCHAFT, Leverkusen (DE)

(72) Inventors: Christof Backhaus, Hückeswagen (DE); Katharina Berger, Weilerswist (DE); Uwe Schenkel, Langenfeld (DE); Jürgen Schmidt, Bad Laasphe (DE); Walter Speth, Pulheim (DE); Klaus Glismann, Cologne (DE); Eric Willms, Cologne (DE); Markus Storz, Leverkusen (DE); Arne Wendt, Burscheid (DE); Gregory Dibble, Chesterfield, MO (US); Richard Fuechtenbusch, Dormagen (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 334 days.

This patent is subject to a terminal disclaimer.

(21) Appl. No.: 17/612,924

(22) PCT Filed: May 18, 2020

(86) PCT No.: PCT/EP2020/063750
§ 371 (c)(1),
(2) Date: Nov. 19, 2021

(87) PCT Pub. No.: WO2020/234209
PCT Pub. Date: Nov. 26, 2020

(65) Prior Publication Data
US 2022/0230045 A1 Jul. 21, 2022

(30) Foreign Application Priority Data
May 22, 2019 (EP) .................................. 19175840
Feb. 6, 2020 (EP) .................................. 20155772

(51) Int. Cl.
G06K 19/077 (2006.01)
G06K 19/07 (2006.01)
G06Q 10/0833 (2023.01)

(52) U.S. Cl.
CPC ... *G06K 19/07798* (2013.01); *G06K 19/0717* (2013.01); *G06K 19/0723* (2013.01); *G06Q 10/0833* (2013.01)

(58) Field of Classification Search
CPC ......... G06K 19/07798; G06K 19/0717; G06K 19/0723; G06Q 10/0833
See application file for complete search history.

(56) References Cited

U.S. PATENT DOCUMENTS 10,420,059 B2 3/2019 Zinn
2004/0066296 A1 4/2004 Atherton
(Continued)

FOREIGN PATENT DOCUMENTS

DE 19516076 A1 11/1996
DE 10029137 A1 9/2001
(Continued)

*Primary Examiner* — Nabil H Syed
*Assistant Examiner* — Cal J Eustaquio
(74) *Attorney, Agent, or Firm* — Harness, Dickey & Pierce, P.L.C.

(57) ABSTRACT

The invention relates to the monitoring of products by means of active radio tags. According to the invention, packagings of products are provided with an active radio tag that detects at least one environmental condition and/or at least one packaging state, and which emits a signal at time intervals, which provides information about a unique identifier and at least one state in which the respective product is found. The signal is picked up by a receiver that extracts the unique identifier and the state information and transmits together with location information to a computer system.

17 Claims, 5 Drawing Sheets

(56) References Cited

U.S. PATENT DOCUMENTS

Figure 1:
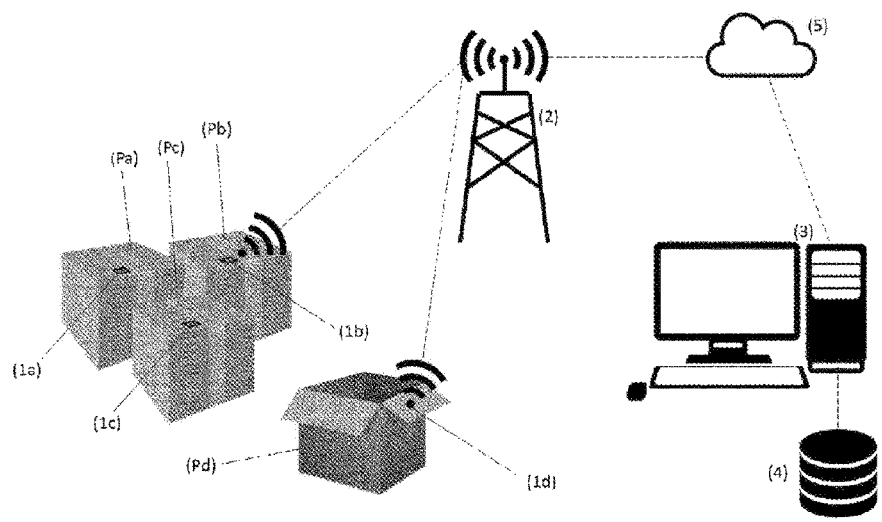

| | | |
|---|---|---|
| 2007/0069895 A1 | 3/2007 | Koh |
| 2007/0152822 A1 | 7/2007 | Eren et al. |
| 2007/0210173 A1 | 9/2007 | Nagel |
| 2008/0061153 A1 | 3/2008 | Hickle et al. |
| 2009/0167531 A1 | 7/2009 | Ferguson |
| 2009/0309722 A1 | 12/2009 | Nichols et al. |
| 2010/0021799 A1 | 1/2010 | Rieke |
| 2010/0081049 A1 | 4/2010 | Holl et al. |
| 2011/0156910 A1 | 6/2011 | Pieper et al. |
| 2013/0285681 A1 | 10/2013 | Wilson et al. |
| 2015/0119086 A1 | 4/2015 | Mirkowski et al. |
| 2015/0332142 A1 | 11/2015 | Coveley et al. |
| 2016/0351936 A1 | 12/2016 | Cooke et al. |
| 2017/0228688 A1* | 8/2017 | Bourlon .............. G06Q 10/087 |
| 2018/0246543 A1* | 8/2018 | Shelmet, Sr. ......... G06F 1/1607 |
| 2018/0322454 A1 | 11/2018 | Komoni |
| 2020/0125917 A1 | 4/2020 | Besnier et al. |

FOREIGN PATENT DOCUMENTS

| | | |
|---|---|---|
| DE | 102010041548 A1 | 3/2012 |
| DE | 102012214203 A1 | 5/2014 |
| DE | 102015121384 A1 | 6/2017 |
| DE | 102016225886 A1 | 6/2018 |
| EP | 0787371 A1 | 8/1997 |
| EP | 3104433 A1 | 12/2016 |
| KR | 20170085256 A | 7/2017 |
| KR | 20170098004 A | 8/2017 |
| WO | WO9604881 A1 | 2/1996 |
| WO | WO2006031824 A2 | 3/2006 |
| WO | WO2006072268 A1 | 7/2006 |
| WO | WO2007101688 A1 | 9/2007 |
| WO | WO2008067830 A1 | 6/2008 |
| WO | WO2009000446 A1 | 12/2008 |
| WO | WO2010068469 A1 | 6/2010 |
| WO | WO2013180399 A1 | 12/2013 |
| WO | WO2018223171 A2 | 12/2018 |
| WO | WO2018234357 A1 | 12/2018 |

* cited by examiner

MONITORING OF PRODUCTS

CROSS-REFERENCE TO RELATED APPLICATIONS

This application is a U.S. national stage filing under 35 U.S.C. § 371 of International Application No. PCT/EP2020/063750, filed on May 18, 2020, which claims the benefit of and priority to European Application No. 19175840.8, filed on May 22, 2019, and European Application No. 20155772.5, filed on Feb. 6, 2020. The entire disclosure of each of the above applications is incorporated herein by reference.

The present invention is concerned with the tracking of products using active radio tags.

For a product manufacturer and/or distributor, it may be useful or even necessary to track products. Pharmaceutical products and plant protection agents are for example subject to a number of official regulations; in some countries, these include the requirement to ensure product traceability (Track & Trace). For this purpose, individual items of packaging are provided with a unique identifier (for example a serial number) (serialization) in order to be able to identify them unambiguously at a later time. A hand-held product may be unambiguously assigned using the unique identifier; however, it is not possible to ascertain the location of a product that has been placed on the market or its status based on the unique identifier alone.

It may also be valuable to track products in order to optimize production and/or for logistical purposes. If a user or distributor of consumable products has a high stock level, it will not be expected that this user/distributor will order a relatively large quantity of new products in the near future. This information may be incorporated into the planning of the manufacture of the products and/or the distribution and/or storage of products that have already been manufactured in order to achieve optimum production machine usage levels and/or warehouse usage levels and/or means of transport usage levels.

It would therefore be desirable to know where individual products that have been placed on the market are located. Furthermore, it would be desirable to know whether an item of packaging in which a product is usually contained before it is used has already been opened or is still unopened, since, when packaging is opened, it may generally be assumed that the products contained therein will be used in the foreseeable future, and new products will then be required.

It would also be advantageous to be able to easily identify whether a product has been damaged or opened before it has reached its destination.

It would be desirable to be able to monitor the entire logistics chain—from manufacture to consumption/use of the product—for example in order to be able to check whether storage conditions have been complied with. It would be desirable to be able to find out the conditions to which products are subject during transport and/or storage.

This is achieved by the subjects of the present invention.

A first subject of the present invention is an active radio tag,
  wherein the radio tag comprises a unique identifier,
  wherein the radio tag is designed such that it is able to be attached to packaging of a product,
  wherein the radio tag comprises at least one sensor, wherein the at least one sensor detects a packaging status,
  wherein the radio tag is configured so as to send the unique identifier and status information about the packaging status to a transceiver via a mobile radio network at time intervals.

Another subject of the present invention is a product comprising packaging, wherein the packaging is attached to an active radio tag,
  wherein the radio tag comprises a unique identifier,
  wherein the radio tag comprises at least one sensor, wherein the at least one sensor detects a packaging status,
  wherein the radio tag is configured so as to send the unique identifier and status information about the packaging status to a transceiver via a mobile radio network at time intervals.

Another subject of the present invention is a system comprising
  at least one active radio tag,
  at least one transceiver,
  a computer system and
  a database,
  wherein the at least one radio tag comprises a unique identifier,
  wherein the at least one radio tag is designed such that it is able to be attached to packaging of a product,
  wherein the at least one radio tag comprises at least one sensor, wherein the at least one sensor detects a packaging status,
  wherein the at least one radio tag is configured so as to send the unique identifier and status information about the packaging status to the at least one transceiver at time intervals,
  wherein the at least one transceiver is configured so as to receive the unique identifier and the status information from the at least one radio tag,
  wherein the at least one transceiver is configured so as to ascertain location information,
  wherein the at least one transceiver is configured so as to transmit the unique identifier, the status information and the location information to the computer system via a network,
  wherein the computer system is configured so as to receive the unique identifier, the status information and the location information from the transceiver,
  wherein the computer system is configured so as to identify a product in a database on the basis of the unique identifier,
  wherein the computer system is configured so as, for the identified product, to store the location information as the location of the product, and
  wherein the computer system is configured so as to store the status information as packaging status for the identified product.

Another subject of the present invention is a method comprising the steps of
  attaching an active radio tag to packaging of a product, wherein the radio tag has a unique identifier,
  the radio tag detecting a packaging status,
  the radio tag transmitting the unique identifier and status information about the packaging status to a transceiver via a mobile radio network,
  the transceiver ascertaining location information,
  the transceiver transmitting the unique identifier, the status information and the location information to a computer system via a network,
  the computer system identifying a product on the basis of the unique identifier, storing the location information as the location of the identified product in a database, storing the status information as the packaging status of the identified product in the database.

Another subject of the present invention is a computer program product comprising program code that is stored on a data carrier and that prompts a computer system to perform the following steps when the program code is loaded into the working memory of the computer system:

receiving a unique identifier, status information and location information via a network, identifying a product on the basis of the unique identifier, storing the location information as the location of the identified product in a database, storing the status information as the packaging status of the identified product in the database.

The invention will be explained in more detail below without distinguishing between the subjects of the invention. On the contrary, the following explanations are intended to apply analogously to all the subjects of the invention, irrespective of in which context they occur.

If steps are stated in an order in the present description or in the claims, this does not necessarily mean that the invention is restricted to the stated order. On the contrary, it is possible for the steps also to be able to be executed in a different sequence or else in parallel to one another, unless one step builds upon another step, which by definition means that the step building upon the other is executed subsequently (but this will be clear in the individual case). The orders stated are thus preferred embodiments of the invention.

According to the present invention, items of packaging for products are provided with an active radio tag.

The product may be any item (a physical product) able to be offered and sold commercially.

The product is preferably a consumable item or a consumable material that is used by a user (end customer) for a defined purpose and "consumed" in the process, that is to say is transferred into a state in which it is no longer able to be used for the original purpose, meaning that the user has to purchase a new product. It is preferably a product that is not intended for immediate use by a user, but rather may be stored for a certain period of time before it is used. The storage time is preferably at least several weeks to several years (for example 6 months or 9 months or 1 year or 18 months, or 2 years or 3 years or the like).

Examples of products in the sense of the present invention are medicinal products, plant protection agents, seeds, cosmetics, cleaning agents and the like. The product is preferably a plant protection agent (for example a herbicide, an insecticide or a fungicide) or a seed.

The product is contained in packaging. The packaging may be used to put the product in a transportable condition and/or to protect it from environmental influences that might damage the product (for example moisture, oxygen, light and the like).

Examples of packaging are containers, crates, cardboard boxes, boxes, envelopes, films, blister packaging, canisters, bottles, barrels, sacks, bags, casks and the like.

The packaging is equipped with an active radio tag. The term "tag" indicates that the radio tag has a flat extent. Flat extent means that the radio tag extends in three directions in space (for example in a Cartesian coordinate system), wherein the dimensions in two directions in space are many times greater than the dimensions in the third direction in space. The dimensions in the directions in space may be referred to as length, width and thickness, wherein length indicates the maximum dimension in a first direction in space, width indicates the maximum dimension in a second direction in space and thickness indicates the maximum dimension in the third direction in space. The length is preferably 0.1 to 10 times the width and the thickness is preferably at least 50 times, preferably at least 100 times the length or the width. The area defined by the length and the width is also referred to as base area in this description. The size of the base area is usually in the range of 10 $cm^2$ to 200 $cm^2$.

The term "active radio tag" means that the radio tag has means for supplying electrical energy to the radio tag.

The electrical energy serves to supply electricity to the radio tag so that it is able to perform its functions according to the invention. It may in this case for example be a battery or an accumulator battery. In one preferred embodiment, the energy supply means is a printable battery, as described by way of example in US2010021799A, EP3104433A1, KR20170085256A, KR20170098004A and US2010081049A. In one embodiment of the present invention, the battery is biodegradable (see for example US2016351936A).

The radio tag may furthermore be designed such that it obtains electrical energy from the surroundings of the radio tag. The energy from the surroundings may for example be provided in the form of light, electric fields, magnetic fields, electromagnetic fields, movement, pressure and/or heat and/or other forms of energy and used or "harvested" by the radio tag. This type of electrical energy generation is known as energy harvesting. Energy harvesting in the field of electronics denotes methods by way of which extremely small amounts of freely available energy are able to be obtained from the surroundings and stored. This technology makes it possible to supply radio tags with energy throughout their entire service life, meaning that they no longer have to be serviced after installation. Energy harvesting systems usually comprise an energy converter and an energy management unit having an energy storage unit, which is usually a capacitor. The energy converter, also known as a microgenerator, converts energy from the surroundings into electrical energy. By way of example, the piezoelectric effect, the thermoelectric effect or the photoelectric effect may be used for the conversion. Further details are described in the prior art (see for example http://www.harvesting-energy.de/ and the publications listed there).

The radio tag is usually attached to the packaging after the packaging has been filled with the product and closed. However, it is also conceivable for the radio tag to be attached to the packaging before the product is filled into the packaging and/or the packaging is closed.

It is also conceivable for the radio tag to be part of the packaging.

The radio tag may for example be printed on the packaging or combined (for example laminated) with the packaging to form a composite.

The radio tag may be located outside the packaging—this is the area of the packaging that has no contact with the product but has contact with the outside world (environment). The radio tag may however also be located inside the packaging—this is the area of the packaging that is in contact with the product. It is also conceivable for the radio tag to be placed between two items of packaging.

The radio tag may be affixed/inserted on or in a closure mechanism of the packaging (for example on or in a screw cap).

In one embodiment of the present invention, the radio tag, as soon as it has been attached to the packaging, is irreversibly attached to the packaging, that is to say any attempt to remove the radio tag from the packaging would lead to destruction of the radio tag, wherein "destruction of the radio tag" means that the radio tag is no longer able to be used according to the invention. Such an irreversible attachment may be achieved for example through an adhesive bond between the radio tag and the packaging, wherein the force required to overcome the adhesive bond and thus to detach the radio tag from the packaging is greater than the force holding the individual components of the radio tag together, meaning that any detachment attempt leads to individual components of the radio tag being separated from one another.

In another embodiment of the present invention, the radio tag is designed such that it is able to be reused. It may therefore be detached from the packaging again and attached to another item of packaging.

The radio tag has a unique identifier. The unique identifier may be a number or an alphanumeric code or a binary code or the like. The unique identifier is used to identify the radio tag or to identify the product to which the radio tag is attached via the packaging. A product database usually forms part of the system according to the invention. The unique identifier may be used to query information (product name, product type, manufacturer, batch number, date of manufacture, composition, usage instructions, expiry date, best-before date and the like) about the respective product from the database.

The identifier is stored in a data memory of the radio tag. This is preferably a semiconductor memory. The data memory for the unique identifier is usually a WORM memory (WORM: write once, read many). It is conceivable for the radio tag already to have a unique identifier prior to attachment to the packaging. However, it is also conceivable for the unique identifier to be written to the data memory only after the radio tag has been attached to the packaging. A control unit of the radio tag is able to access the data memory and read the unique identifier. The control unit may send the unique identifier by way of a transmission unit of the radio tag.

The unique identifier is stored both in a data memory of the radio tag and in a separate product data memory, such that the unique identifier and the product are related to one another and, if the unique identifier is known, information about the product may be obtained from the product database.

The radio tag has at least one sensor. A "sensor" is a technical component that is able to detect certain physical or chemical properties and/or the material nature of its surroundings in a qualitative manner, or in a quantitative manner as a measured variable. The properties are detected by way of physical or chemical effects and transformed into further-processable, usually electrical signals. Before the electrical signals are transmitted to a transceiver via radio, they are usually also digitized.

The at least one sensor detects measured values that characterize the status of the packaging and/or of the product. Status information is thus generated via the at least one sensor.

In one preferred embodiment, the radio tag comprises a sensor that detects whether the packaging is unopened or whether it is open/has been opened.

The sensor detects the packaging status (unopened/open) preferably on the basis of a physical property that changes if the packaging has been opened and/or is open. The physical property that changes by the packaging being opened may be for example an electrical conductivity (or an electrical resistance) and/or an electrical capacitance and/or an inductance, or the like.

It is conceivable for the sensor to be designed such that it checks, at defined time intervals, whether the packaging is open or unopened.

In one embodiment of the present invention, the radio tag has one or more electrical conductors (for example one or more electrically conductive wires and/or electrical conductor tracks) that are affixed such that at least one electrical conductor is irreversibly interrupted when the packaging is opened, such that electric current is no longer able to flow through this electrical conductor. The sensor identifies an interrupted electrical conductor by the fact that the conductivity has changed. This principle is described for example in WO9604881A1 or DE19516076A1. In the present case, the electrical conductor acts as an indicator; opening the packaging leads to an irreversible change to the indicator: the electrical conductor is interrupted.

It is conceivable for the sensor to be designed such that it detects the process of opening the packaging. The change in status (unopened→open) may for example be detected by sensors on the basis of the piezoelectric effect: opening the packaging leads to mechanical stress on a piezoelectric element, as a result of which an electrical voltage is built up. This voltage or its effect may be registered by a sensor.

The radio tag may have a data memory in which the information about the packaging status is stored. It is conceivable for the sensor to be designed such that it checks, at defined time intervals, whether the packaging is still unopened; as soon as it is opened, the corresponding (new) packaging status is stored in a data memory. Before the radio tag transmits status information about the packaging status to a transceiver, a control unit, which is part of the radio tag, reads the packaging status from the data memory. The detection of the packaging status and the sending of the status information are decoupled in such a case. The radio tag may be configured such that it queries the packaging status by way of a sensor, at defined times, until the sensor registers that the packaging is open/has been opened. After that, no further querying of the packaging status via a sensor is necessary.

It is conceivable, in addition to the packaging status "open/unopened", for other packaging statuses to be detected by one or more sensors, such as for example the packaging has been squeezed or not squeezed, the packaging has been exposed to a temperature above a defined maximum temperature value or below a defined minimum temperature value, the packaging has been exposed to (air) humidity above a defined maximum humidity value or below a defined minimum humidity value, the packaging has been exposed to a pressure above a defined maximum pressure value or below a defined minimum pressure value, the packaging has been exposed to acceleration forces above a defined maximum acceleration value, and the like. Such a packaging status identifies environmental conditions to which an item of packaging has been exposed before the time at which the respective packaging status was detected. To detect packaging statuses, use is usually made of sensors in which a component is irreversibly changed by environmental conditions above and/or below defined limit values (maximum values/minimum value). Such a component is also referred to as an indicator in this description. The indicator thus indicates whether the indicator has been exposed to a defined environmental condition.

Furthermore, there may be one or more sensors present that detect environmental conditions to which the packaging and/or the product and/or the radio tag is/are exposed at the time of acquisition of the measured value. Examples of such environmental conditions are: temperature, (air) pressure, (air) humidity, acceleration forces, exposure to electromagnetic radiation of a defined wavelength range and/or the like.

The aim of detecting such environmental conditions and/or packaging statuses may be that of tracking whether the transport and/or storage conditions required for the product have always been complied with in the distribution chain—from manufacture to the end user. The aim of detecting environmental conditions and/or packaging statuses may also be that of tracking transport and/or storage conditions so that the current location of a certain product and/or its status is always known.

It is conceivable that the product has to be refrigerated so that it does not spoil. In such a case, a temperature sensor may detect the temperature at defined times. If a measured temperature value is above a defined maximum temperature value, it becomes obvious that the cold chain is currently not being complied with. However, it is also possible to use a sensor that comprises a temperature indicator that is irreversibly changed by a temperature above a defined maximum temperature value. During detection, the sensor checks whether the temperature indicator has changed (because the temperature in the past was above the defined maximum temperature value) or whether it has not changed.

It is conceivable that the product is not frostproof and should therefore not be exposed to a temperature below a minimum temperature value. In such a case, a temperature sensor may detect the temperature at defined times. If a measured temperature value is below a defined minimum temperature value, it becomes obvious that the product has been exposed to excessively low temperatures and might have been damaged. However, it is also possible to use a sensor that comprises a temperature indicator that is irreversibly changed by a temperature below a defined minimum temperature value. During detection, the sensor checks whether the temperature indicator has changed (because the temperature in the past was below the defined limit value) or whether it has not changed.

It is conceivable that the product must not get wet, since otherwise it will be damaged or a loss of quality may be feared; in such a case, a humidity sensor may detect the humidity (for example air humidity) at defined times. If a measured humidity value is above a defined maximum humidity value, it becomes obvious that the current humidity is excessively high, and measures should be taken to reduce the humidity. However, it is also possible to use a sensor that comprises a humidity indicator that is irreversibly changed by a humidity above a defined maximum humidity value.

During detection, the sensor checks whether the humidity indicator has changed (because the humidity in the past was above the defined limit value) or whether it has not changed.

It is conceivable that a product is sensitive to acceleration forces, for example because it is fragile. In such a case, an acceleration sensor may detect the acceleration forces at defined times. If a measured value of the acceleration forces currently acting on the sensor is above a defined maximum acceleration value, it becomes obvious that there is a risk of the product being damaged. However, it is also possible to use a sensor that comprises an acceleration indicator that is irreversibly changed by acceleration forces above a defined maximum acceleration value. During detection, the sensor checks whether the acceleration indicator has changed (because the acceleration forces in the past were above the defined limit value) or whether it has not changed.

It is conceivable that a product is light-sensitive. In such a case, a light intensity sensor may detect the intensity of electromagnetic radiation of a defined wavelength range (for example in the visible light range (380 nm to 780 nm) and/or in the ultraviolet light range (for example UV-A (380 nm to 315 nm) and/or UV-B (315 nm to 280 nm)) or another wavelength range or multiple wavelength ranges) at defined times. If a measured value of the light intensity currently acting on the sensor is above a defined maximum light intensity value, it becomes obvious that the product is currently exposed to an excessively high light intensity; measures should be taken to reduce the light intensity. However, it is also possible to use a sensor that comprises a light indicator that is irreversibly changed by a light intensity above a defined maximum light intensity value. During detection, the sensor checks whether the light indicator has changed (because the light intensity in the past was above the defined limit value) or whether it has not changed.

There are a large number of commercially available sensors and indicators for measuring temperature, humidity, pressure, acceleration, light intensity and other environmental conditions.

Environmental conditions may be detected using one or more sensors at defined times. "Defined time" means that the time at which a measured value is acquired follows clear rules. For example, it is conceivable for a measured value to be acquired at predetermined times, such as for example once a day at 12 noon, or every hour on the hour or the like. A "defined time" should however also be understood to mean the occurrence of a defined event that triggers acquisition of a measured value, such as for example an external (electromagnetic) pulse, a vibration and the like.

The active radio tag may furthermore have a timer. The radio tag is able to determine the respective time at which a measured value is acquired and/or information is sent to the transceiver. The respective time may likewise be transmitted to the transceiver as time information.

It is conceivable for the acquisition of measured values and the sending of information via a network to a transceiver to be coupled to one another, for example in such a way that acquisition of measured values is initiated prior to sending of information and the one or more acquired measured values are then sent. However, decoupling is also conceivable; in this case, the radio tag has a data memory in which measured values may be stored. Measured values are acquired at defined times and stored in the data memory. Before information is sent, a control unit, which is part of the radio tag, ascertains the stored measured values and sends them, or derived information, to the transceiver.

The same applies to ascertaining and sending one or more packaging statuses. Measured values for ascertaining a packaging status are acquired at defined times, and this may be coupled to the sending of the status information or be decoupled therefrom. It is conceivable for measured values to be acquired immediately before sending; it is conceivable for measured values to be acquired, stored in a data memory and read before the measured values are sent.

The radio tag is designed such that it is able to send information (unique identifier, status information about the packaging status, possibly information about environmental conditions, possibly time information) to a transceiver via a mobile radio network.

The term mobile radio network denotes the technical infrastructure on which mobile radio signals are transmitted. A mobile radio network is a communication network in which a mobile radio unit is connected wirelessly to a stationary transceiver. The network is distributed over areas referred to as cells, each of which is served by at least one stationary transceiver, but normally by three cell sites or base transceiver stations. These base stations provide the cell with network coverage, which may be used to transmit voice, data and other types of content.

Information is usually transmitted from the radio tag to a transceiver via a mobile radio network based on the GSM, GPRS, 2G, 3G, LTE, 4G, 5G standard or another standard.

For this purpose, the radio tag has a transmission unit comprising a modem and an antenna for sending information via a GSM, GPRS, 2G, 3G, LTE, 4G, 5G mobile radio network or via another mobile radio network.

Radio tags and transceivers are preferably tuned to one another in order to consume as little energy as possible for the transmission of information from the radio tag to the transceiver. The radio tag is preferably configured such that it is in an idle mode for the majority of the time. It becomes active at defined times and sends information to a transceiver in the vicinity (within range) of the radio tag.

Information may be sent for example once an hour or once a day or irregularly.

It is conceivable for the radio tag to send information at regular or irregular times. It is conceivable for the radio tag to be activated by an event and then send information. The event may be triggered by environmental conditions and/or by the transceiver and/or by a human. It is conceivable for the radio tag to be activated by light when a minimum brightness is reached and/or by heat when a minimum temperature is reached. It is also conceivable for the radio tag to be activated by reaching a defined sum of heat or a defined sum of light (amount of energy).

The transceiver is designed such that it is able to receive the information (unique identifier, status information about the packaging status, possibly information about environmental conditions, possibly time information) sent by a radio tag or multiple radio tags from the transceiver via a mobile radio network.

The transceiver is preferably a mobile radio base station that receives information from one or more radio tags within range of the mobile radio base station.

The transceiver is furthermore configured so as to ascertain location information. Ascertaining the location information serves to assign the radio tag or the product to which the radio tag is attached to a location.

A satellite navigation system offers location determination with comparatively good accuracy. Known satellite navigation systems are for example NAVSTAR GPS, GLONASS, Galileo or Beidou. For location determination using a satellite navigation system, the radio tag may be equipped with a sensor for receiving signals from a multiplicity of satellites of the satellite navigation system. Such a location determination solution however requires a comparatively large amount of energy and also means additional component costs for the radio tags. Furthermore, it is not necessary to ascertain an exact location for many applications, but rather it is enough to know the area in which a product is located.

The transceiver may be equipped with a sensor for receiving signals from a multiplicity of satellites of the satellite navigation system. However, the transceiver is generally installed in a stationary manner and its location therefore does not change. In the case of a transceiver stationed in a stationary manner, the location is usually known.

The location information may therefore be derived from the (mobile) radio cell in which the transceiver is located.

In mobile communications, the simplest way of determining position is based on the fact that the cell in which a transmission unit is present is known. Since for example a switched-on mobile telephone is connected to a base station, the position of the mobile telephone is able to be assigned to at least one mobile radio cell (cell ID).

In the same way, the position of the radio tag may be equated to the mobile radio cell to which the transceiver is connected. With the aid of GSM (Global System for Mobile Communications), it is possible to determine the location of a radio tag to an accuracy of several hundred meters. In towns, the location is able to be determined to an accuracy of 100 to 500 m; in rural areas, the radius increases to 10 km or more. If the information about the cell ID is combined with the TA parameter (TA: Timing Advance), then accuracy is able to be increased. The higher this value, the further away a radio tag is from the base station. The EOTD method (EOTD: Enhanced Observed Time Difference) may be used to locate a transmission unit with even more accuracy. In this case, the propagation time differences of the signals between the radio tag and multiple reception units are determined. The prior art describes further possible ways of determining position (see for example DE10029137A1, DE102010041548A1, DE102012214203A1, DE102015121384A1, DE102016225886A1, US2015119086A1).

In one embodiment, information is transmitted and the location is determined via a Low Power Wide Area Network (LPWAN), such as for example the Sigfox network. An LPWAN is designed specifically for small data packets and very low-energy operation. LPWAN base stations are able to communicate over long distances without being affected by interference. The range of a single base station, which is able to manage up to a million radio tags, is 3 to 5 km in areas of high population density and 30 to 70 km in rural areas. In the case of an LPWAN, the data packets are received by all base stations within transmission range. This may be used to determine the position of a radio tag.

The transceiver may furthermore be configured so as to ascertain time information. The time information may be the time at which information was received from a radio tag and/or the time at which location information was ascertained and/or the time at which information was sent to a computer system.

The transceiver links the received information (unique identifier, status information about the packaging status, possibly information about environmental conditions, possibly time information) with the ascertained location information and possibly with the time information and sends all of the data to a computer system via another wireless and/or wired network.

A "computer system" is an electronic data processing system that processes data by way of programmable computing rules. Such a system usually comprises a "computer", the unit that comprises a processor for performing logic operations, and also peripherals.

In computer technology, "peripherals" denotes all devices that are connected to the computer and are used to control the computer and/or as input and output devices. Examples thereof are monitor (screen), printer, scanner, mouse, keyboard, drives, camera, microphone, speakers, etc. Internal ports and expansion cards are also regarded as peripherals in computer technology.

Modern computer systems are frequently divided into desktop PCs, portable PCs, laptops, notebooks, netbooks and tablet PCs, and what are called handhelds (for example smartphones); all of these systems may be used to implement the invention.

Inputs into the computer system are made via input means, such as for example a keyboard, a mouse, a microphone, and/or the like. Input should also be understood to mean the selection of an entry from a virtual menu or from a virtual list or clicking on a checkbox and the like.

Outputs from the computer system are usually provided via a screen, a printer or by storage in a data memory.

The computer system may be used to manage the data of a multiplicity of radio tags. It is conceivable for a plurality of computer systems to exist, these being distributed for example over different countries and/or geographical regions.

The computer system receives the information (unique identifier, status information about the packaging status, possibly information about environmental conditions, location information, possibly time information).

The computer system may be configured so as to ascertain time information. The time information may be for example the time at which the information was received by the transceiver.

The computer system is connected to one or more product databases (for example via a network). Such a database may also be an (integral) part of the computer system. On the basis of the unique identifier, the computer system identifies the product to which the unique identifier is assigned by querying the database.

The computer system is configured so as to store the location information as the location of the identified product in the database.

The computer system is configured so as to store the status information as the packaging status of the product in the database.

In one preferred embodiment, the computer system is furthermore configured so as to store, for the identified product, the environmental conditions to which the product has been exposed.

Any information that is stored by the computer system for an identified product in the database may be provided with time information. The time information may be the time at which a measured value on which the information is based was acquired by a sensor of the radio tag. The time information may be the time at which the radio tag sent the information to the transceiver. The time information may be the time at which the information was received by the transceiver. The time information may be the time at which the transceiver sent the information to the computer system. The time information may be the time at which the computer system received the information.

If the computer system stores such time information for example with regard to the location of the product, it is possible to ascertain where the product was located at different times (tracking).

If the computer system stores such time information for example with regard to the packaging status of the product, it is possible to ascertain the one or more times at which changes in the packaging status occurred.

If the computer system stores such time information for example with regard to environmental conditions of the product, it is possible to ascertain the environmental conditions to which the product has been exposed at different times.

The computer system may be configured to ascertain a location for an identified product from the database and to compare this location with the location information. In the event of a discrepancy, the computer system may transmit a message to a person, for example to the manufacturer of the product or the distributor of the product. Such a message may contain the location information and thus notify the person that the location of the product has changed.

The computer system may be configured so as to ascertain a packaging status for an identified product from the database and to compare this with the status information. In the event of a discrepancy, the computer system may transmit a message to a person, for example to the manufacturer of the product or the distributor of the product. Such a message may contain the information that the packaging status has changed and notify the person of the updated packaging status.

The computer system may be configured so as to ascertain a (permissible) maximum value for an identified product from the database and to compare this with an environmental condition to which the product has been exposed. If the environmental condition is above the (permissible) maximum value, the computer system may transmit a message to a person, for example to the manufacturer of the product or the distributor of the product. Such a message may contain the information that the product is/has been exposed to an environmental condition that is above a (permissible) maximum value; the product may have been damaged; it would be conceivable to take measures to prevent further damage or to withdraw the product from the market.

The computer system may be configured so as to ascertain a (permissible) minimum value for an identified product from the database and to compare this with an environmental condition to which the product has been exposed. If the environmental condition is below the (permissible) minimum value, the computer system may transmit a message to a person, for example to the manufacturer of the product or the distributor of the product. Such a message may contain the information that the product is/has been exposed to an environmental condition that is below a (permissible) minimum value; the product may have been damaged; it would be conceivable to take measures to prevent further damage or to withdraw the product from the market.

A large number of radio tags and transceivers preferably form part of the system according to the invention, such that it is known, for a large number of product units, where they are located and what state they are in. Production processes and/or logistics and/or storage are able to be optimized on the basis of this information.

In one embodiment of the present invention, the manufacturer of the products has access to the computer system and uses the information to optimize the manufacture of the products, for example by initiating the manufacture of products when the number of unopened items of packaging possessed by end customers falls below a defined threshold value.

In one embodiment of the present invention, a distributor of the products has access to the server and uses the information to order new products and/or to transport them to a defined warehouse when the number of unopened items of packaging possessed by end customers falls below a defined threshold value.

In one preferred embodiment, the radio tag has an optically readable code, such as for example a barcode or a matrix code (such as for example a QR code or data matrix code). The optically readable code comprises a unique identifier on the basis of which the radio tag and/or the product and/or a product batch and/or the like are able to be unambiguously identified. This may be the same unique identifier able to be accessed by the control unit of the radio tag. However, it may also be a different (further) unique identifier. The optical code may furthermore comprise an Internet address. The optically readable code is for example printed, engraved or etched onto the radio tag, affixed to the radio tag in the form of a sticker or attached to the radio tag in some other way or incorporated into the radio tag.

The optical code is used to provide the buyer/user of the product with further information about the product. This is achieved for example by the buyer/user reading the optically readable code into the mobile computer system using a mobile computer system, such as for example a smartphone or a tablet computer. Mobile computer systems usually have a camera by way of which it is possible to read optical codes. The mobile computer system is preferably configured (by way of an installed software program (an "app")) such that, on the basis of the scanned optical code, it opens a website on which information about the product is presented to the buyer/user. This may be information that is specifically intended for the buyer/user of this product. By way of example, it is conceivable to present a message about a recall of the product or information about what to do if the product has been exposed to defined environmental conditions that may mean a loss of quality.

In one preferred embodiment, the buyer/user receives, via the radio tag, a message that he should scan the optical code and thus set up access to a website containing information that has been provided for him. It is conceivable for example for the radio tag to have a status display that tells the buyer/user whether the packaging of the product is closed (for example sealed), whether it is open and usable, or whether he should retrieve further information from the website, which he is able to access via the optical code, before using the product. The status display may be for example one or more light-emitting diodes (LEDs) or a liquid crystal display (LCD). It is conceivable for the control unit of the radio tag to be configured such that it changes the information displayed by way of the status display when the measured values acquired by way of one or more sensors assume or reach defined values. By way of example, the status display may display that the packaging is properly closed when the packaging status sensor registers that the packaging is closed. The status display may display that the packaging is open when the packaging status sensor registers that the packaging is open (has been opened). The status display may display (warning signal) that the product has been exposed to harmful environmental conditions (an excessively high temperature, an excessively low temperature, an excessively high air humidity, an excessively high pressure, an excessively high acceleration and the like) if a sensor registers that a limit value (temperature, air humidity, pressure, acceleration force, etc.) is (has been) fallen below or exceeded. Such a warning signal warns the buyer/user that there may be something wrong with the product and that he should retrieve information via the website before using it. It is also conceivable for the radio tag to have a reception unit by way of which the radio tag is able to receive a signal. It is thereby possible for example to change the status display via an external signal, for example in order to recall a product.

In one particularly preferred embodiment, the radio tag is present together with an electrical energy supply unit in the form of a film composite. A film composite is advantageous because it is flexible (pliable) and is therefore able to be applied to both flat and curved surfaces of an item of packaging. A film composite may be produced inexpensively in large quantities in a roll-to-roll process (see for example Zheng Cui et al.: Printed Electronics, Wiley 2016, ISBN: 9781118920923; S. Lanceros-Méndez et al.: Printed Batteries, Wiley 2018, ISBN: 9781119287896).

The film composite comprises at least one carrier layer. An antenna and electrical conductor tracks are applied to the at least one carrier layer (on the top side). The antenna and/or the conductor tracks may for example be applied to the at least one carrier layer by way of a printing process (see for example EP0787371A1, WO2010/068469A1, WO2013/180399A1). At least one integrated circuit (IC) is applied to the at least one carrier layer (on the top side), wherein the at least one integrated circuit comprises a control unit, at least one sensor for detecting a packaging status, a transmission unit and a data memory. An electrochemical cell is applied to the at least one carrier layer (on the top side). The term electromagnetic cell comprises both individual cells having only one anode and one cathode and a combination of multiple individual cells (battery). The electromagnetic cell has preferably been applied to the at least one carrier in a printing process.

The electrical conductor tracks connect the integrated circuit to the electrochemical cell and to the antenna.

Underneath the at least one carrier layer (on the bottom side) is an adhesive layer for connecting the film composite to an item of packaging. The adhesive layer is preferably provided with a protective layer (peel-off film) that is able to be removed without leaving any residue before the radio tag is stuck onto the packaging.

A flexible plastic film, for example made of PI, PP, MOPP, PE, PPS, PEEK, PEK, PEI, PSU, PAEK, LCP1 PEN, PBT, PET, PA, PC, COC, POM1 ABS, PVC, fluoropolymer, such as Teflon, or the like is preferably used as carrier film.

The at least one carrier film is preferably made of polyethylene terephthalate, polyethylene naphthalate, polyester, polyimide, polypropylene, BOPP (biaxially oriented polypropylene), polyethylene or polyamide.

The carrier film preferably has a thickness of 5-700 μm, preferably 5-200 μm, particularly preferably 30-100 μm.

Paper or composites containing paper, for example composites containing plastics with a weight per unit area of 20-500 g/m$^2$, preferably 40-200 g/m$^2$, may furthermore be used as carrier films. Fabrics or nonwovens, such as continuous fiber nonwovens, staple fiber nonwovens and the like, which may optionally be needled or calendered, may furthermore be used as carrier films. Such fabrics or nonwovens preferably consist of plastics such as PP, PET, PA, PPS and the like, but fabrics or nonwovens made of natural, possibly treated fibers such as viscose fiber nonwovens may also be used. The fabrics or nonwovens that are used have a weight per unit area of around 20 g/m$^2$ to 500 g/m$^2$. These fabrics or nonwovens may possibly be surface-treated.

The at least one carrier film may of course also be formed from two or more different layers, such as plastic layers, paper layers, metal layers, etc., which are for example adhesively bonded or laminated to one another.

Au, Ag, Cu, Al, Zn and Cu may be used as the metal layer for the antenna and/or the electrical conductor tracks. Possible coating methods include for example screen printing, intaglio printing, flexographic printing, inkjet printing or offset printing. Printed conductive layers, such as conductive polymers, Ag or Cu conductive paste, and carbon conductive paste may furthermore also be considered. The thickness of the metal layers forming the antenna and/or electrical conductor tracks is preferably 0.5 to 50 μm.

The components applied to the at least one carrier film (on the top side) may be provided with a protective film, a lacquer or a coating.

Comparable film composites and processes for manufacturing them are described in the prior art (see for example: WO2007/101688A1, WO2009/000446A1, WO2018223171A2, WO2008/067830A1).

The flat film composite preferably has a flat extent (length times width) in the range of 10 cm² to 200 cm². The thickness is preferably 0.5 mm to 5 mm. The flat film composite may have any shape; the surface by way of which the film composite is connected to an item of packaging preferably has a four-sided (for example rectangular, square or trapezoidal), five-sided or six-sided (basic) shape.

An electrical conductor (for example in the form of a conductive wire or an electrically conductive conductor track) is preferably inserted between two layers of the film composite. The sensor is configured so as to detect an interruption in the electrical conductor, for example on the basis of the associated change in the electrical conductivity of the electrical conductor. The electrical conductor preferably has a U-shape. The term "U-shape" also includes shapes similar to that of the letter U, such as for example the shape of a V, the shape of a horseshoe, the shape of a rectangle with one side missing, the shape of a trapezoid with one side missing, the shape of a loop and the like. The U-shape preferably extends along the base area of the radio tag.

In one particularly preferred embodiment, the radio tag has an offshoot (protrusion) that extends in one direction on one side of the radio tag. Such an offshoot is thus an extension of the radio tag on one side of the radio tag in a direction that runs parallel to the base area of the radio tag. The offshoot is in this case narrower than the side of the radio tag from which the offshoot extends outward. The electrical conductor is preferably placed on the offshoot or below the offshoot or within the offshoot (for example between two layers or films). In this embodiment too, the electrical conductor preferably extends in a U-shape along the offshoot. If the radio tag is applied to an item of packaging, it may be applied to the packaging such that the offshoot is applied above an opening and/or an access point to the packaging. When the packaging is opened, the offshoot is then severed and the electrical conductor is interrupted in the process.

The offshoot may be part of the at least one carrier film; however, it may also be affixed to the at least one carrier film.

In one particularly preferred embodiment, a predetermined breaking point (tearing edge, breaking edge, weak spot) is present between the offshoot and the carrier film or the remaining part of the carrier film (depending on whether the offshoot is part of the carrier film or a separate part), and/or within the offshoot. In the event of mechanical stress on the offshoot, in particular in the event of the offshoot being pulled (for example when opening the packaging), the offshoot is separated or severed from the (remaining) carrier film at the predetermined breaking point. This separation/severing also includes the electrical conductor contained in the offshoot, which is then interrupted. The predetermined breaking point facilitates the interruption of the electrical conductor, on the one hand, but, on the other hand, primarily directs it in a defined manner: the electrical conductor is not severed just anywhere, but rather along the predetermined breaking point. The predetermined breaking point may be designed for example as a perforation, notch, taper, groove, cut, adhesive bond and/or the like.

Further preferred embodiments of the invention are:
1. An active radio tag, wherein the radio tag comprises a unique identifier, wherein the radio tag is designed such that it is able to be attached to packaging of a product, wherein the radio tag comprises at least one sensor, wherein the at least one sensor detects a packaging status, wherein the at least one sensor detects, as packaging status, whether the packaging is open or unopened or whether the packaging has been opened or has not been opened, wherein the radio tag is configured so as to send the unique identifier and status information about the packaging status to a transceiver via a mobile radio network at time intervals,
2. The active radio tag according to embodiment 1, wherein the at least one sensor comprises an electrical conductor that is interrupted when the packaging is opened.
3. The active radio tag according to either of embodiments 1 and 2, wherein the at least one sensor is at least one indicator that detects one or more of the following packaging statuses:
   the packaging has been opened,
   the packaging has been squashed,
   the packaging has been exposed to a temperature above a defined maximum temperature value or below a defined minimum temperature value,
   the packaging has been exposed to (air) humidity above a defined maximum humidity value or below a defined minimum humidity value,
   the packaging has been exposed to a pressure above a defined maximum pressure value or below a defined minimum pressure value,
   the packaging has been exposed to acceleration forces above a defined maximum acceleration value,
   the packaging has been exposed to electromagnetic radiation in a defined wavelength range, the intensity of which is above a defined maximum intensity value.
4. The active radio tag according to one of embodiments 1 to 3, comprising at least one further sensor for detecting measured values of an environmental condition, wherein the product and/or the packaging and/or the radio tag are subject to the environmental condition at the time of acquisition of the measured values, wherein the radio tag is configured so as to send the unique identifier and the status information about the packaging status and environmental information about the environmental condition to a transceiver via a mobile radio network at time intervals.
5. The active radio tag according to embodiment 4, wherein the environmental condition is one or more of the following environmental conditions: temperature, air pressure, air humidity, acceleration forces, intensity of electromagnetic radiation in a defined wavelength range.
6. The active radio tag according to one of embodiments 1 to 5, comprising a control unit, at least one sensor for detecting a packaging status, a transmission unit and a data memory, wherein the unique identifier is stored in the data memory.
7. The active radio tag according to embodiment 6, comprising a status display, wherein the control unit is configured so as to ascertain the packaging status by way of the sensor and to prompt the status display to display the packaging status.
8. The active radio tag according to embodiment 6, comprising a sensor for detecting an environmental condition and a status display, wherein the control unit is configured so as to receive at least one measured value from the sensor, to compare the at least one measured value with a defined limit value, and in the event that the measured value is below or above the defined limit value, to prompt the status display to display a warning signal.

9. The active radio tag according to one of embodiments 1 to 8, comprising a reception unit for receiving a signal via the mobile radio network and a status display, wherein the control unit is configured so as to receive a signal by way of the reception unit and to prompt the status display to display a warning signal.

10. An active radio tag having a unique identifier, comprising at least one electrical conductor and at least one carrier film, wherein the at least one carrier film has a flat extent with a top side and a bottom side, wherein the following components are applied to the top side of the at least one carrier film: a transmission unit, a sensor and an energy supply unit, wherein an adhesive layer is affixed to the bottom side of the at least one carrier film, via which adhesive layer the radio tag is able to be attached to packaging of a product, wherein the sensor is configured so as to detect a packaging status, wherein the sensor is configured so as to detect the packaging status "unopened packaging" in the event that the electrical conductor is not interrupted, and to detect the packaging status "open packaging" in the event that the electrical conductor is interrupted, wherein the transmission unit is configured so as to send the unique identifier and the packaging status to a transceiver via a mobile radio network at time intervals.

11. A product comprising packaging and an active radio tag according to one of embodiments 1 to 10.

12. The product according to embodiment 11, wherein the active radio tag is affixed above an opening in the packaging and/or above an access point to the packaging.

13. The product according to embodiment 12, wherein the active radio tag has an electrical conductor that is affixed such that it is interrupted when the product is opened.

14. The product according to one of embodiments 11 to 13, wherein the sensor is configured so as to detect the packaging status "unopened packaging" in the event that the electrical conductor is not interrupted, and to detect the packaging status "open packaging" in the event that the electrical conductor is interrupted.

15. A system comprising at least one active radio tag, at least one transceiver, a computer system and a database, wherein the at least one radio tag comprises a unique identifier, wherein the at least one radio tag is designed such that it is able to be attached to packaging of a product, wherein the at least one radio tag comprises at least one sensor, wherein the at least one sensor detects a packaging status when the sensor is attached to packaging of a product, wherein the at least one radio tag is configured so as to send the unique identifier and status information about the packaging status to the at least one transceiver at time intervals, wherein the at least one transceiver is configured so as to receive the unique identifier and the status information from the at least one radio tag, wherein the at least one transceiver is configured so as to ascertain location information, wherein the at least one transceiver is configured so as to transmit the unique identifier, the status information and the location information to the computer system via a network, wherein the computer system is configured so as to receive the unique identifier, the status information and the location information from the transceiver, wherein the computer system is configured so as to identify a product in the database on the basis of the unique identifier, wherein the computer system is configured so as, for the identified product, to store the location information as the location of the product, and wherein the computer system is configured so as to store the status information as the packaging status for the identified product.

16. The system according to embodiment 15, wherein the at least one radio tag is at least one radio tag according to one of embodiments 1 to 10.

17. The system according to embodiment 15 or 16, comprising at least one radio tag according to embodiment 4, wherein the transceiver is configured so as to transmit the unique identifier and the environmental information about the environmental condition to the computer system, wherein the computer system is configured so as to identify the product in the database, to which the unique identifier is assigned, on the basis of the unique identifier, wherein the computer system is configured so as to ascertain a minimum value or a maximum value for the identified product from the database, to compare the environmental information with the minimum value or with the maximum value and, in the event that the environmental information falls below the minimum value or the environmental information exceeds the maximum value, to transmit a message about the falling below or about the exceedance to a person.

18. A method comprising the steps of:
    attaching an active radio tag to packaging of a product, wherein the radio tag has a unique identifier,
    the radio tag detecting a packaging status.
    the radio tag transmitting the unique identifier and status information about the packaging status to a transceiver via a mobile radio network,
    the transceiver ascertaining location information,
    the transceiver transmitting the unique identifier, the status information and the location information to a computer system via a network,
    the computer system identifying a product on the basis of the unique identifier,
    storing the location information as the location of the identified product in a database,
    storing the status information as the packaging status of the identified product in the database.

19. The method according to embodiment 18, furthermore comprising the steps of:
    the radio tag detecting an environmental condition,
    the radio tag transmitting environmental information about the environmental condition to the transceiver via a mobile radio network,
    the transceiver transmitting the environmental information about the environmental condition to the computer system via a network,
    the computer system storing the environmental information as an environmental condition to which the identified product has been subject in the database.

20. The method according to embodiment 19, furthermore comprising the steps of:
    the computer system ascertaining a minimum value or a maximum value from the database for the identified product,
    the computer system comparing the environmental information with the minimum value or with the maximum value, in the event that the environmental information falls below the minimum value or the environmental information exceeds the maximum value: the computer system transmitting a message about the falling below or about the exceedance to a person.
21. The method according to one of embodiments 18 to 20, furthermore comprising the steps of:
acquiring a time,
the computer system storing the location information and the time as the location that the identified product had at the time in the database, and/or
the computer system storing the status information as the packaging status that the identified product had at the time in the database, and/or
the computer system storing the environmental information as an environmental condition to which the identified product was subject at the time in the database.
22. The method according to one of embodiments 18 to 21, furthermore comprising the steps of:
ascertaining a location for the identified product from the database, and
comparing the location information with the ascertained location and, in the event of a discrepancy: transmitting a message about the discrepancy to a person, or
determining a packaging status for the identified product from the database, and
comparing the status information with the ascertained packaging status and, in the event of a discrepancy: transmitting a message about the discrepancy to a person.
23. A computer program product comprising program code that is stored on a data carrier and that prompts a computer system to perform the following steps when the program code is loaded into the working memory of the computer system:
receiving a unique identifier, status information and location information via a network,
identifying a product on the basis of the unique identifier,
storing the location information as the location of the identified product in a database,
storing the status information as the packaging status of the identified product in the database.
24. The computer program according to embodiment 23, wherein the program code prompts the computer system to perform one or more of the steps of the method according to one of embodiments 18 to 22 when the program code is loaded into the working memory of the computer system.
25. The use of a radio tag according to one of embodiments 1 to 10 and/or of a product according to one of embodiments 11 to 14 and/or of a system according to one of embodiments 15 to 17 to optimize the manufacture of products and/or to optimize the storage of products and/or to optimize the distribution of products.

The invention is explained in detail below with reference to figures and examples, without any intention to restrict the invention to the features and combinations of features specified in the figures and examples.

In the figures below:

FIG. 1 schematically shows one example of a system according to the invention comprising a multiplicity of radio tags (1a, 1b, 1c, 1d), a transceiver (2) and a computer system (3).

The radio tags (1a, 1b, 1c, 1d) are affixed to the packaging of the products (Pa, Pb, Pc, Pd). The packaging of three products (Pa, Pb, Pc) is in the unopened state; the packaging of one product (Pd) is in the open state.

In the figure, radio symbols indicate the fact that two radio tags (1b, 1d) each send information. The information may comprise unique identifiers of the radio tags, status information about the packaging statuses, and possibly further information.

The information that is sent may be received by the transceiver (2). The transceiver adds at least location information to the received information and transmits all of the information to the computer system (3) via a network (5). The computer system (3) is connected to a database (4). In FIG. 1, the computer system (3) is connected directly to the database (4). It is also possible for the computer system (3) to be connected to the database (4) via the network (5).

On the basis of the received unique identifiers of the radio tags, the computer system (3) is able to ascertain the respective products to which the unique identifiers are assigned in the database (4) and store the received location information and the received status information for the respective product.

Figure 2:
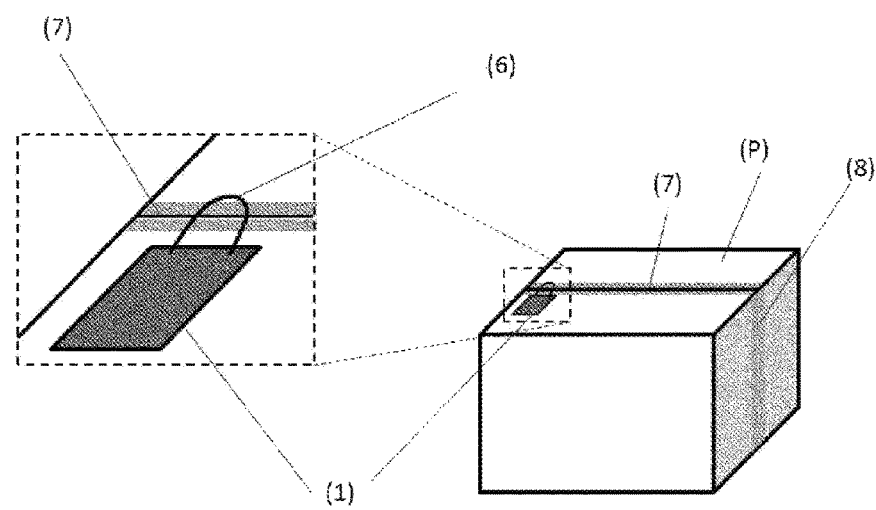

FIG. 2 schematically shows one example of a radio tag (1) that is affixed to the packaging of a product (P). The packaging is closed by an adhesive strip (8). If the adhesive strip (8) were to be peeled off or cut along the line (7), an electrical conductor (6) (for example an electrically conductive wire), which is part of the radio tag (1), would be interrupted. The radio tag (1) may be set up such that it identifies the interruption of the electrical conductor (6) and is thus able to distinguish whether the packaging is unopened or open.

Figure 3:
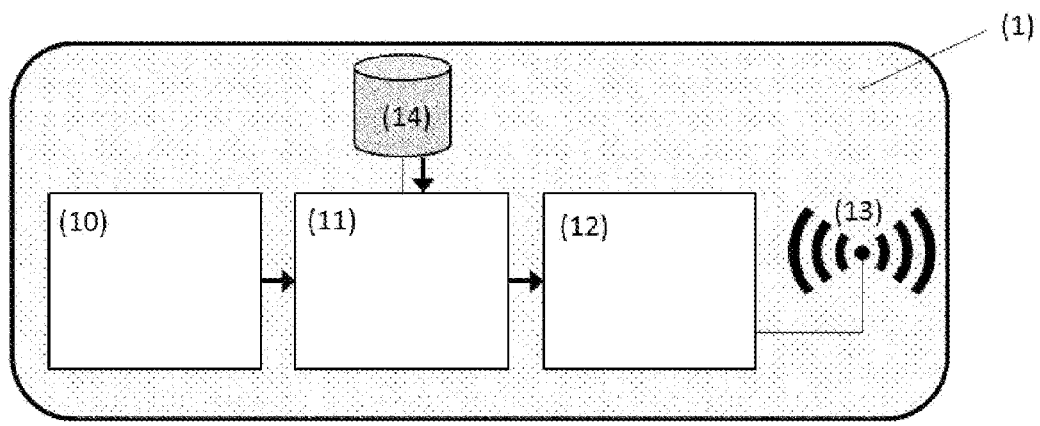

FIG. 3 schematically shows one example of a radio tag (1). The radio tag (1) has a sensor (10) for detecting the packaging status (for example open/unopened). A control unit (11) is used to control the individual components and to coordinate the data and signal flows. Information may be sent via radio by way of a transmission unit (12, 13). A unique identifier is stored in a data memory (14).

Figure 4:
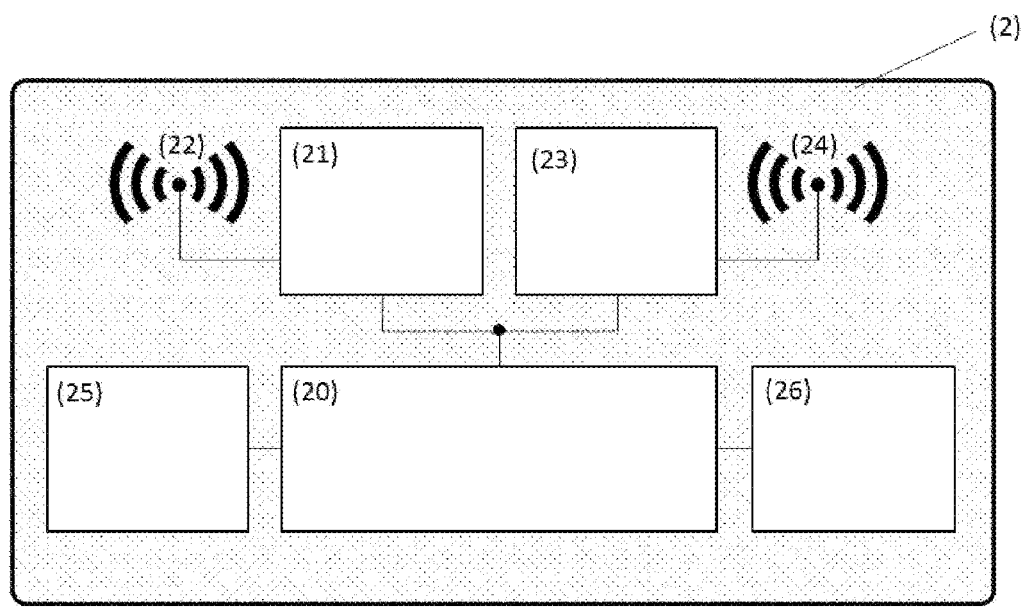

FIG. 4 schematically shows one example of a transceiver (2). The transceiver (2) has a reception unit (21, 22) by way of which information is able to be received via mobile radio. A control unit (20) is used to control the individual components and to coordinate the data and signal flows. The location of the transceiver (2) or of a radio tag (not shown) (location information) may be ascertained by way of a location ascertainment unit (25). Information may be transmitted via a network (not shown) to a computer system (not shown) by way of a transmission unit (23, 24).

Figure 5:
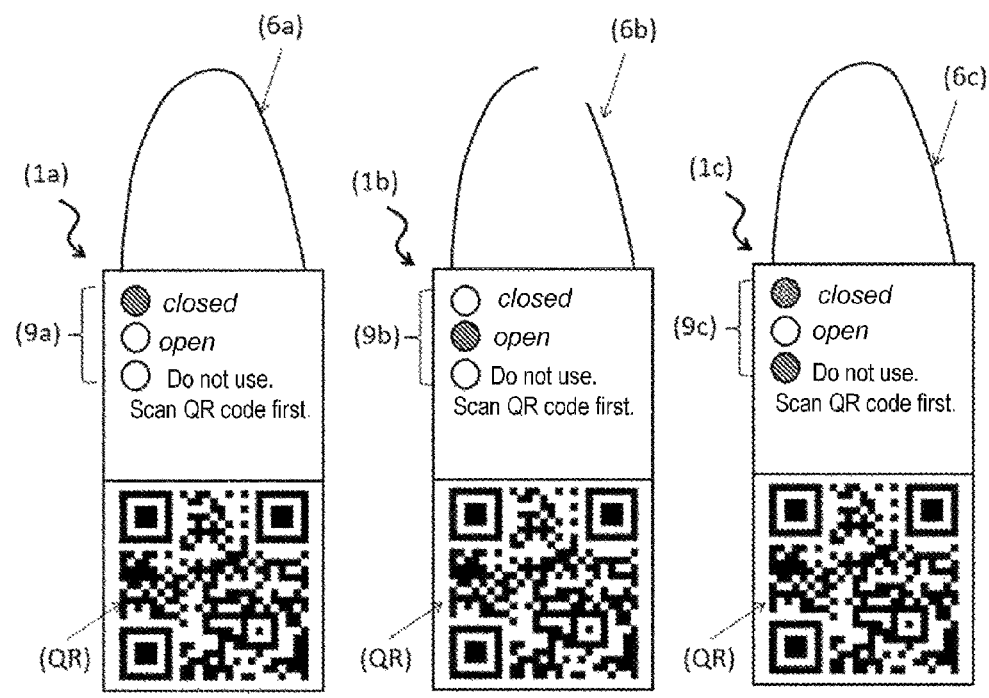

FIG. 5 shows, by way of example, three radio tags (1a, 1b, 1c) in different states. Each of the radio tags (1a, 1b, 1c) has a conductive wire (6a, 6b, 6c), a status display (9a, 9b, 9c) and an optically readable code (QR).

In the case of the radio tag (1a), the conductive wire (6a) is intact. A control unit (not shown) of the radio tag detects the conductivity of the wire (6a) via a sensor (not shown) and identifies that the wire (6a) is intact. The control unit prompts the status display (9a) to display that the packaging is closed ("sealed"). This display is implemented for example by way of a light-emitting diode or a liquid crystal display.

In the case of the radio tag (1b), the conductive wire (6b) is interrupted. The control unit detects, by way of the conductivity sensor, that the wire (6b) is interrupted and prompts the status display (9b) to display that the packaging is open ("unsealed").

In the case of the radio tag (1c), the conductive wire (6c) is intact. The control unit detects, by way of the conductivity sensor, that the wire (6c) is intact and prompts the status display (9c) to display that the packaging is closed ("sealed"). At the same time, the status display (9c) displays that the buyer/user should not use the product but should first scan the optical code (QR). The buyer/user uses the optical code to access a website that provides him with further information.

Figure 6:
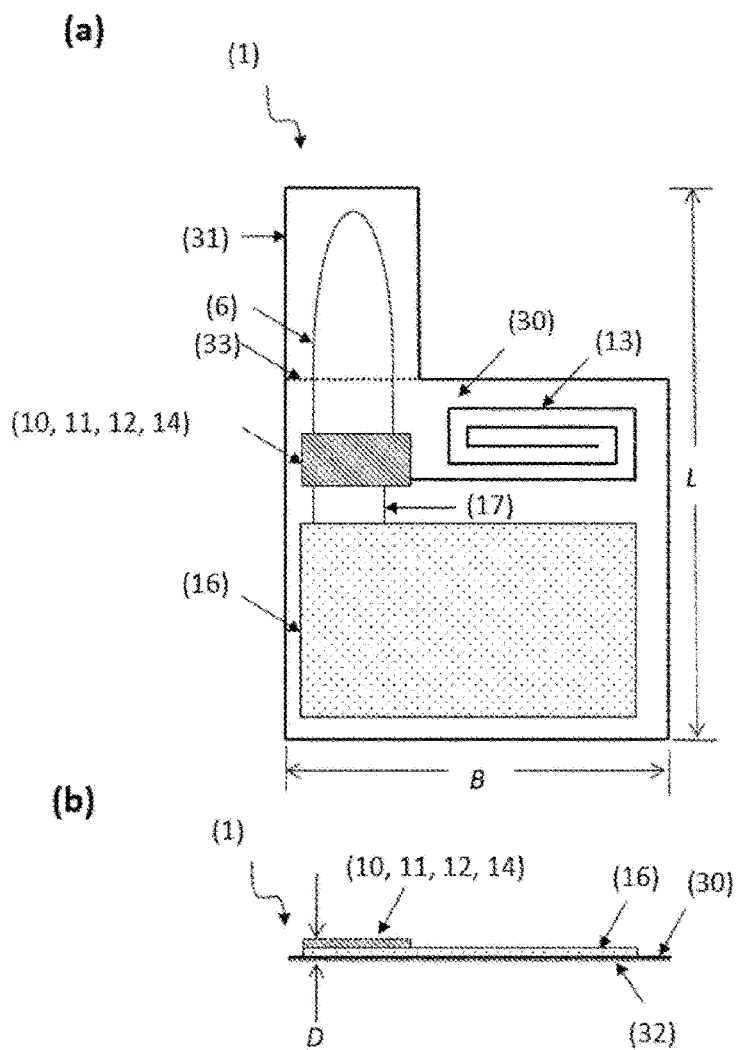

FIG. 6 schematically shows one preferred embodiment of the radio tag according to the invention (a) in a plan view (from above) and (b) in a side view (from the front). The radio tag (1) has a flat extent; the length L and the width B are of the same order of magnitude, but they are many times greater than the thickness D. The basic shape of the radio tag (1) is hexagonal or the basic shape consists of two interconnected rectangles. The radio tag (1) is designed as a film composite. The radio tag (1) has a carrier film (30). The following components are applied to the carrier film (30) (on the top side): an antenna (13), an energy supply unit (16), for example in the form of an electrochemical cell, an electrical conductor (6), electrical conductor tracks (17) and an integrated circuit that combines a sensor (10), a control unit (11), a transmission unit (12) and a data memory (14). The radio tag (1) has an offshoot (31) that extends in one direction starting from one side of the radio tag (1). The electrical conductor (6) is arranged on the offshoot (31) in a U-shape. The offshoot (31) is separated from the remaining part of the radio tag (1) by a predetermined breaking point (33). The predetermined breaking point (33) is designed as a perforation. An adhesive layer (32) is affixed below the carrier film (30), via which adhesive layer the radio tag (1) is able to be attached to the packaging of a product.

Figure 7:
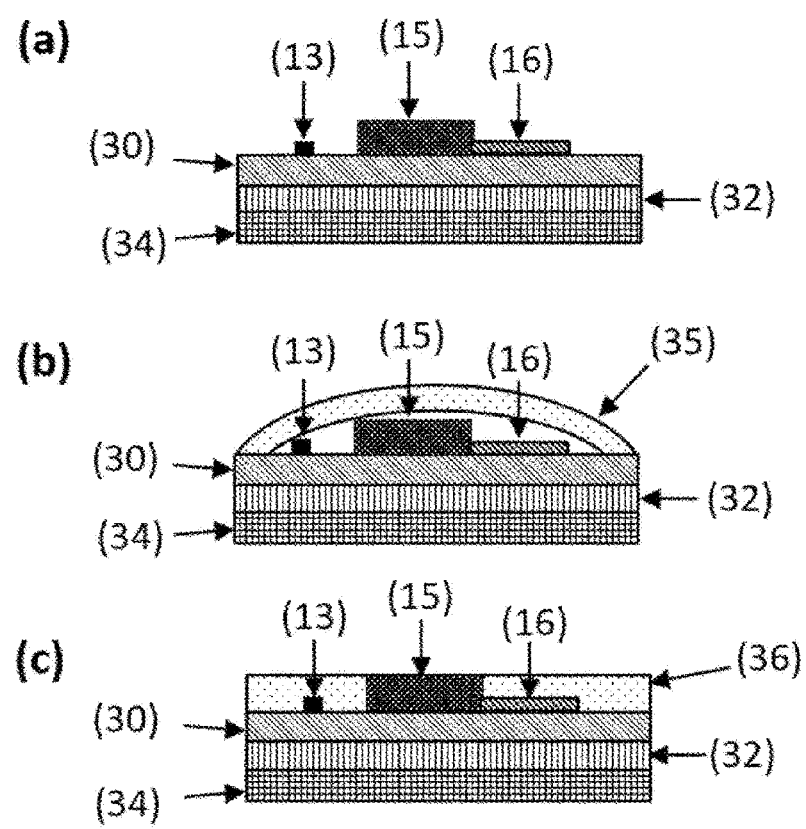

FIG. 7 schematically shows preferred embodiments of the radio tag according to the invention in a side view. The radio tag (1) is designed as a film composite. The radio tag (1) has a carrier film (30). It is possible to see the following components, which are applied to the carrier film (30): an antenna (13), an integrated circuit (15) and an energy supply unit (16). An adhesive layer (32) is affixed below the carrier film (30). The adhesive layer (32) is protected by a protective film (34). In embodiment (b), a protective film (35) is affixed above the carrier film (30) and protects the components (13, 15, 16) on the carrier film (30) from environmental influences. In embodiment (c), a coating (36) is applied to the carrier film (30) and protects the components (13, 15, 16) on the carrier film (30) from environmental influences. Embodiment (a) does not have a protective layer above the carrier film (30).

What is claimed is:

1. An active radio tag configured for attachment to packaging of a product, the active radio tag comprising:
   a flat flexible film composite including a carrier layer having a first portion and a second portion, the first portion separated from the second portion by a perforated breaking point defined in the carrier layer;
   an integrated circuit applied to the first portion of the carrier layer, the integrated circuit including: a data memory, a transmission unit, a first sensor configured to detect a packaging status of the product, and a second sensor configured to detect an environmental condition;
   an electrical conductor arranged on the second portion of the carrier layer, the electrical conductor coupled to the first sensor across the perforated breaking point, the first sensor configured to detect the packaging status of the product based on an interruption in the electrical conductor at the perforated breaking point; and
   a unique identifier stored in the data memory;
   wherein the radio tag is configured so as to send the unique identifier and status information about the packaging status, via the transmission unit, to a transceiver via a mobile radio network at time intervals.

2. The radio tag as claimed in claim 1, wherein the carrier layer has a top side and a bottom side;
   wherein the following components are applied to the top side of the first portion of the carrier layer: the integrated circuit and an energy supply unit; and
   wherein an adhesive layer is affixed to the bottom side of the carrier layer, via which adhesive layer the radio tag is able to be attached to the packaging of the product.

3. The radio tag as claimed in claim 2, wherein the electrical conductor is arranged such that the electrical conductor is interrupted when the packaging is opened.

4. The radio tag as claimed in claim 2, wherein the first sensor is configured so as to detect the packaging status "unopened packaging" in the event that the electrical conductor is not interrupted, and to detect the packaging status "open packaging" in the event that the electrical conductor is interrupted.

5. The radio tag as claimed in claim 4, wherein the electrical conductor is arranged along the top side and/or bottom side of the second portion of the carrier layer in a U-shape.

6. The radio tag as claimed in claim 2, further comprising a status display;
   wherein the integrated circuit further includes a control unit, and wherein the control unit is configured so as to ascertain the packaging status by way of the first sensor and to prompt the status display to display the packaging status.

7. The radio tag as claimed in claim 6, wherein the control unit is configured so as to receive at least one measured value from the second sensor for detecting the environmental condition, to compare the at least one measured value with a defined limit value, and in the event that the at least one measured value is below or above the defined limit value, to prompt the status display to display a warning signal.

8. The radio tag as claimed in claim 6, further comprising a reception unit for receiving a signal via the mobile radio network, wherein the control unit is configured so as to receive a signal by way of the reception unit and to prompt the status display to display a warning signal.

9. A product comprising packaging and the radio tag as claimed in claim 1, wherein the radio tag is affixed above an opening in the packaging or above an access point to the packaging such that the electrical conductor is interrupted when the packaging is opened.

10. A system comprising:
    the radio tag as claimed in claim 1;
    the transceiver;
    a computer system; and
    a database;
    wherein the transceiver is configured so as to receive the unique identifier and the status information from the radio tag;
    wherein the transceiver is configured so as to ascertain location information for the radio tag;
    wherein the transceiver is configured so as to transmit the unique identifier, the status information and the location information to the computer system via a network;

wherein the computer system is configured so as to receive the unique identifier, the status information and the location information from the transceiver;

wherein the computer system is configured so as to identify the product in the database on the basis of the unique identifier;

wherein the computer system is configured so as, for the identified product, to store the location information as the location of the product; and wherein the computer system is configured so as to store the status information as packaging status for the identified product.

11. A method comprising:

removing a protective film from a radio tag, the radio tag comprising a flexible carrier layer having a first portion and a second portion separated from the first portion by a perforated breaking point, wherein the first portion of the flexible carrier layer includes: (i) a data memory, (ii) a transmission unit, (iii) a first sensor configured to detect at least one packaging status of a product, and (iv) a second sensor configured to detect an environmental condition, wherein the second portion of the flexible carrier layer includes an electrical conductor coupled to the first sensor across the perforated breaking point, wherein the radio tag is configured to send a unique identifier and status information about the at least one packaging status of the product, via the transmission unit, to a transceiver via a mobile radio network at time intervals;

sticking the radio tag to packaging of the product by way of an adhesive layer applied to the flexible carrier layer;

detecting, by the first sensor of the radio tag, the at least one packaging status of the product based on an interruption in the electrical conductor at the perforated breaking point;

transmitting, by the transmission unit of the radio tag, the unique identifier and status information about the at least one packaging status to the transceiver via the mobile radio network;

ascertaining, by the transceiver, location information for the radio tag;

transmitting, by the transceiver, the unique identifier, the status information and the location information to a computer system via a network;

identifying, by the computer system, the product on the basis of the unique identifier;

storing the location information as the location of the identified product in a database; and storing the status information as the at least one packaging status of the identified product in the database.

12. The radio tag as claimed in claim 3, wherein the electrical conductor is arranged along the top side and/or the bottom side of the second portion of the carrier layer in a U-shape.

13. The method as claimed in claim 11, wherein the radio tag further includes an optically readable code, and wherein the method further comprises receiving a request from a user associated with the packaging for the at least one packaging status of the product, based on the user scanning the optically readable code.

14. The method as claimed in claim 13, further comprising providing the at least one packaging status of the product to the user in response to the request.

15. The method as claimed in claim 13, wherein the user is a purchaser of the product and/or a shipper of the product.

16. The method as claimed in claim 11, wherein the radio tag further includes an optically readable code, and wherein the method further comprises receiving a request from a user associated with the packaging for the at least one packaging status of the product and the environmental condition, based on the user scanning the optically readable code.

17. The radio tag of claim 1, further comprising a status display disposed on the flat flexible film composite, wherein the status display includes: a first display of status information in response to a determination by the first sensor that the electrical conductor is intact, a second display of status information in response to a determination by the first sensor that the electrical conductor is interrupted, and a third display of environmental information in response to a determination by the second sensor that the environmental condition is above or below a defined threshold.

* * * * *